US012811657B2

(12) United States Patent
Badic et al.

(10) Patent No.: US 12,811,657 B2
(45) Date of Patent: Nov. 24, 2026

(54) P2P SIGNALING FOR SMART BEAM HANDOVER AND INITIAL ACCESS IN HIGHLY DIRECTIVE SYSTEMS

(71) Applicant: Apple Inc., Cupertino, CA (US)

(72) Inventors: Biljana Badic, Munich (DE); Norman Goris, Dortmund (DE); Jan K. Ellenbeck, Gruenwald (DE); Stefan Meyer, Hoechstadt (DE); Christian Drewes, Germering (DE); Mikhail Wilhelm, Munich (DE)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 18/789,399

(22) Filed: Jul. 30, 2024

(65) Prior Publication Data

US 2025/0080197 A1 Mar. 6, 2025

Related U.S. Application Data

(60) Provisional application No. 63/535,494, filed on Aug. 30, 2023.

(51) Int. Cl.

| | |
|---|---|
| ***H04B 7/06*** | (2006.01) |
| ***H04B 7/08*** | (2006.01) |
| ***H04W 72/044*** | (2023.01) |

(52) U.S. Cl.

CPC ......... *H04B 7/0695* (2013.01); *H04B 7/0691* (2013.01); *H04B 7/088* (2013.01); *H04W 72/046* (2013.01)

(58) Field of Classification Search

CPC ........... G06F 15/173; H04B 7/06; H04B 7/08; H04B 7/088; H04B 7/0452; H04B 7/0691; H04B 7/0695; H04L 5/00; H04L 12/26; H04L 27/36; H04L 29/06; H04L 29/12; H04L 47/24; H04W 4/00; H04W 4/40; H04W 16/28; H04W 36/00; H04W 64/00; H04W 72/46; H04W 72/044; H04W 76/14; H04W 76/25; H04W 88/06

USPC ............... 375/219, 260, 262, 267, 295, 316; 455/63.4, 456.6, 501, 509, 562.1; 709/224

See application file for complete search history.

(56) References Cited

U.S. PATENT DOCUMENTS 10,123,375 B2 * 11/2018 Segev .................. H04W 4/023
2019/0097712 A1 * 3/2019 Singh .................. H04B 7/0695
2022/0201503 A1 * 6/2022 Wang .................. H04B 7/0695
2023/0239829 A1 * 7/2023 Kumar .................. H04W 24/10
455/456.3

* cited by examiner

*Primary Examiner* — Shawkat M Ali

(74) *Attorney, Agent, or Firm* — Kilpatrick Townsend & Stockton LLP

(57) ABSTRACT

The present application relates to devices and components, including apparatus, systems, and methods for discovering and establishing highly directional wireless communication link through other devices with established highly directional communication link to an access point. Devices with established link to the access point may exchange beam information (BI) or geometry or location indication (GI) between the AP and devices seeking to be connected to the AP. The exchange of BI and GI may expedite link establishment between the AP and devices without connection to the AP.

15 Claims, 11 Drawing Sheets

P2P SIGNALING FOR SMART BEAM HANDOVER AND INITIAL ACCESS IN HIGHLY DIRECTIVE SYSTEMS

CROSS-REFERENCES TO OTHER APPLICATIONS

This application claims priority to U.S. Provisional Application No. 63/535,494, for "P2P SIGNALING FOR SMART BEAM HANDOVER AND INITIAL ACCESS IN HIGHLY DIRECTIVE SYSTEMS," filed on Aug. 30, 2023, which is herein incorporated by reference in its entirety for all purposes.

TECHNICAL FIELD

This application generally relates to wireless communication networks and, in particular, to technologies for handover and initial access in highly directive systems.

BACKGROUND

Highly directive systems with directional beams are considered in advanced wireless communication systems, such as short-range services like sub-terahertz (sub-THz) communication services. These systems concentrate signals in a specific direction, using narrow beams, thereby enhancing data rates and reducing interference. For instance, in urban environments where signal congestion is a challenge, directional beams help establish stable and high-capacity connections between an access point (AP) and devices.

DETAILED DESCRIPTION OF THE INVENTION

Figure 1:
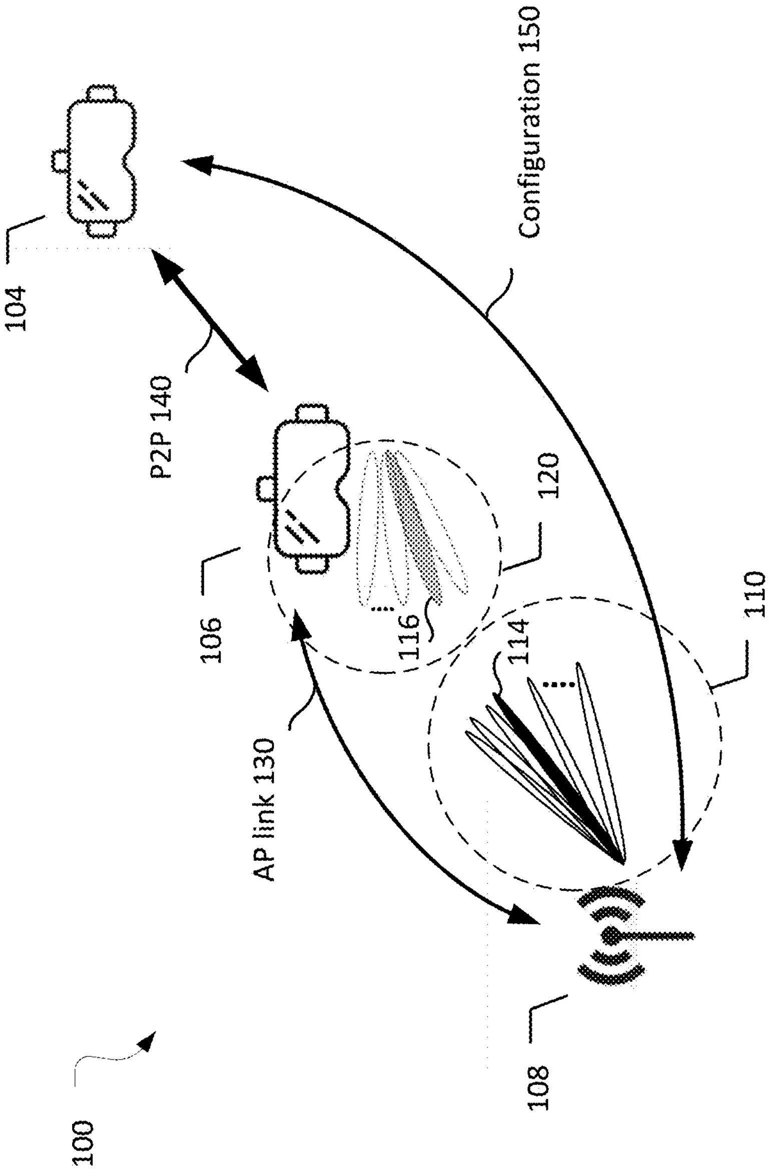
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, and/or techniques, in order to provide a thorough understanding of the various aspects of some embodiments. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B), and the phrase "based on A" means "based at least in part on A," for example, it could be "based solely on A," or it could be "based in part on A."

The following is a glossary of terms that may be used in this disclosure.

The term "circuitry" as used herein refers to, is part of, or includes hardware components, such as an electronic circuit, a logic circuit, a processor (shared, dedicated, or group), or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), and/or digital signal processors (DSPs), that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations; or recording, storing, or transferring digital data. The term "processor circuitry" may refer to an application processor; baseband processor; a central processing unit (CPU); a graphics processing unit; a single-core processor; a dual-core processor; a triple-core processor; a quad-core processor; or any other device capable of executing or otherwise operating computer-executable instructions, such as program code; software modules; or functional processes.

The term "interface circuitry," as used herein, refers to, is part of, or includes circuitry that enables the exchange of information between two or more components or devices. The term "interface circuitry" may refer to one or more hardware interfaces; for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device, including a wireless communications interface.

The term "computer system," as used herein, refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to a computer, storage, or network resources provided by physical hardware element(s). A "virtualized resource" may refer to a computer, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects, or services accessible through a server where such system resources reside on a single host or multiple hosts and are clearly identifiable.

The term "channel," as used herein, refers to any tangible or intangible transmission medium used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link," as used herein, refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during the execution of program code.

The term "connected" may mean that two or more elements at a common communication protocol layer have an established signaling relationship with one another over a communication channel, link, interface, or reference point.

The term "network element," as used herein, refers to physical or virtualized equipment or infrastructure used to provide wired or wireless communication network services. The term "network element" may be considered synonymous with or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include a device 106 coupled with an access point (AP) 108 of a radio access network (RAN). The air interface over which the device 106 and the AP 108 communicate may be compatible with 3GPP technical specifications (TSs), such as those that define Fifth Generation (5G) NR or later system standards (e.g., Sixth Generation (6G) standards). The air interface may be compatible with wireless local-area networks (WLAN) or wide-area networks (WWAN), such as those defined by Wi-Fi or other highly directional communication standards. A highly directional communication system may use the sub-terahertz (sub-THz) band.

Sub-THz links may use narrow and directional beams. Therefore, sub-THz links may be prone to blockages or have a higher probability of beam misalignment as compared to links using wider beams. Frequent beam handover or beam vector tracking and updating is also more challenging when beams are narrower. The narrow beam enables sub-THz links to provide high speed and low latencies, making them suitable for applications and services, referred to as sub-THz services, that require high throughput and low latencies.

The AP 108 may transmit information in one or more beams 110. The AP 108 may use a subset of the beams 110, e.g., beam 114 (shaded black in FIG. 1 to facilitate identification), to communicate information with the device 106. The AP 108 may use different beams to communicate with different devices simultaneously.

Similarly, the device 106 may transmit information in one or more beams 120. The device 106 may use a subset of the beams 120, e.g., beam 116 (shaded gray in FIG. 1 to facilitate identification), to communicate information with the AP.

In one instance, the sub-THz services may be provided in indoor areas, e.g., shopping malls, train stations, airports, or offices, where users may mostly move in similar directions, e.g., train platforms, gates, shops, or coffee corners. In such environments, information sharing among users on sub-THz connectivity and coverage may speed up beam tracking and initial access. Exploiting location information and beam information may reduce handover delay. For example, if the AP 108 has location information of a device, e.g., device 104, it may predict the direction of movement or future destination or location of the device 104. The device 104 may calculate or predict its direction of movement and future destination or location and provide them as part of its location or geographic information.

The network environment 100 may include a device 104 coupled with the device 106. The air interface over which devices 104 and 106 communicate may be compatible with 3GPP TSs such as those in 5G NR or later system standards, e.g., 6G, wireless local area (WLAN) neighborhood-aware networking (NAN) standards (for example, Wi-Fi® NAN standards), or short-range networking (SRN) standards (for example, Bluetooth® standards).

In one instance, when devices, e.g., device 106 and device 104, are in proximity of each other, e.g., within approximately 10 meters of one another, they may establish a peer-to-peer (P2P) communication link 140. For example, devices 104 and 106 may use omnidirectional transmissions to establish short-range P2P link 140, e.g., WLAN NAN or SRN.

Consider a scenario in which device 106 and AP 108 are communicatively connected via the AP link 130, the device 106 is communicatively connected with device 104 via P2P link 140, and device 104 is not communicatively connected with the AP 108. Further, consider that device 104 is moving into a location that is within range of the AP 108 and also capable and configured to establish a communication link, similar to the AP link 130, with the AP 108.

As part of establishing a communication link in a legacy system, the device 104 and the AP 108 may perform beam discovery or beam alignment procedures. Beam discovery may involve systematically exploring potential beam configurations to identify an alignment between the transmission and reception beams for communication. The devices may exchange control signals (reference, pilot, or beacon) transmitted on different beams. The receiver may estimate the channel condition or potential beam direction based on the received control signals. The information from channel conditions and beam direction may be used to select a subset of potential beam direction. In some instances, the device 104 or the AP 108 may perform techniques such as beam sweeping, where they sequentially test different beams to identify a suitable beam, e.g., a beam with a signal strength larger than a threshold or beam(s) having the largest signal strength.

In addition to beam discovery, the device 104 or the AP 108 may perform a beam alignment procedure. The beam alignment procedure may include fine-tuning the candidate beams identified through the beam discovery process. Device 104 and AP 108 may continually exchange feedback to adjust the beam angles during the beam alignment iteratively.

Performing beam discovery and beam alignment in a legacy system may cause delays in exchanging data and payload between the device 104 and the AP 108. However, if the AP 108 has information about the location of the device 104 and could associate the information with its transmission beams, the AP 104 may reduce the beam discovery process by limiting the subset of beams involved in the beam discovery process. For example, if the device 104 is moving towards the direction of the device 106, the AP 108 may use the same beam to communicate with the device 106 to establish a link with the device 104. In one embodiment, the AP 108 may skip the beam discovery process and use one or more beams associated with the location of the device 104. In addition, simplifying the beam discovery, beam tracking, and updating processes may reduce the device's power consumption.

In one embodiment, the information about the location of the device 104 may be used at the AP 108 to avoid a particular beam. For example, the AP 108 may use the location information of the device 104 and beam information from prior handovers or nearby users to avoid a particular beam that did not have sufficient signal or link quality for previous users in similar locations and conditions.

In one embodiment, the AP 108 may exploit location information, and devices 104 and 106 may utilize P2P communication to accelerate the handover process and reduce initial access time for sub-THz systems and services.

In one embodiment, the device 104 may advertise its interest in using sub-THz services. For example, the device 104 may broadcast messages, including an indication of a search or request to establish sub-THz services. The advertisement may be part of broadcast information used to establish a P2P link with another device, e.g., device 106.

In one embodiment, beam information (BI) may indicate a beam or a beam configuration. For example, the device 106 may send BI to the AP 104 to indicate that device 106 may use the same AP transmitting beam (or beams). The BI may also indicate a set of neighboring beams. Neighboring beams may be referred to as a set of beams that collectively provide communication coverage to a geographic area. A neighbor beam may refer to a beam adjacent to another beam in terms of direction or angle. Neighboring beams may cover adjacent areas or serve users in close proximity. In another instance, the AP 108 may send BI to device 106 to indicate one or more beam configurations for device 104 initial access or handover. The device 106 may forward the BI information received from the AP 108 to the device 104.

In one embodiment, geometry indication (GI) may be used to indicate device location or orientation. For example, GI may indicate whether the device, e.g., a phone, is vertical or horizontal handheld. The GI may contain device beam configuration from the connected peer(s). The location information may be obtained by any ranging or positioning techniques. For example, devices 104 or 106 may use available sensors, e.g., Lidar, ultra-wideband (UWB), or RADAR, on the device or on a connected device such as glasses, watch, or phone to estimate relative position to other devices or APs. The devices may use ranging methods, e.g., using WLAN NAN ranging, to estimate their relative position with respect to other devices or APs. The location information may be included in the GI. For example, the GI may include absolute device location, e.g., GPS coordinates, or relative location, e.g., with respect to other devices or APs. The GI, associated with a device or an AP, may include indication related to the beam pattern information, e.g., the number of beams and the shape or direction of beams.

Devices 104 or 106 may use the accelerometer, gyroscope, magnetometer, or other measurement devices to determine additional location information such as orientation, speed, direction of motion, or acceleration. This additional location information may be included in the GI.

In one embodiment, the device 106, having sub-THz service with the AP 108 and P2P connection with the device 104, may receive an indication that the device 104 is requesting sub-THz services and approaching the sub-THz service area. Based on the indication from the device 104, the device 106 may inform the AP 108 about upcoming devices or traffic. The device 106 may send BI and GI to AP 108 via the AP link 130 or to the device 104 via P2P link 140. The AP 108 may use a pre-learning beam mechanism to identify a beam that was previously used at the same location as the upcoming device 104.

In one embodiment, the AP 108 may send configuration 150 to device 104 via the device 106. For example, the AP 108 may send the configuration 150 to device 106, and device 106 may forward the configuration 150 to the device 104. The configuration 150 may include BI indicating a suggested transmission beam or a set of transmission beams. The device 104 may use the indicated beam or limit beam discovery to the suggested set of transmission beams. The device not connected to the sub-THz AP 108, e.g., device 104, may use the BI to determine the beam used by the AP 108, the subset of beams to perform beam search, or beams to avoided and reduce the complexity and latency associated with the beam search process or initial access.

In one embodiment, the configuration 150 may include timing information. The device 104 may use the timing information to perform synchronization with the AP 108.

In one embodiment, the device 106 selects a beam or a set of beams based on the GI information associated with the AP 108. The device 106 may use the selected beam for initial transmission to the AP 108 or may use the selected set of beams to perform beam detection and alignment.

Figure 2:
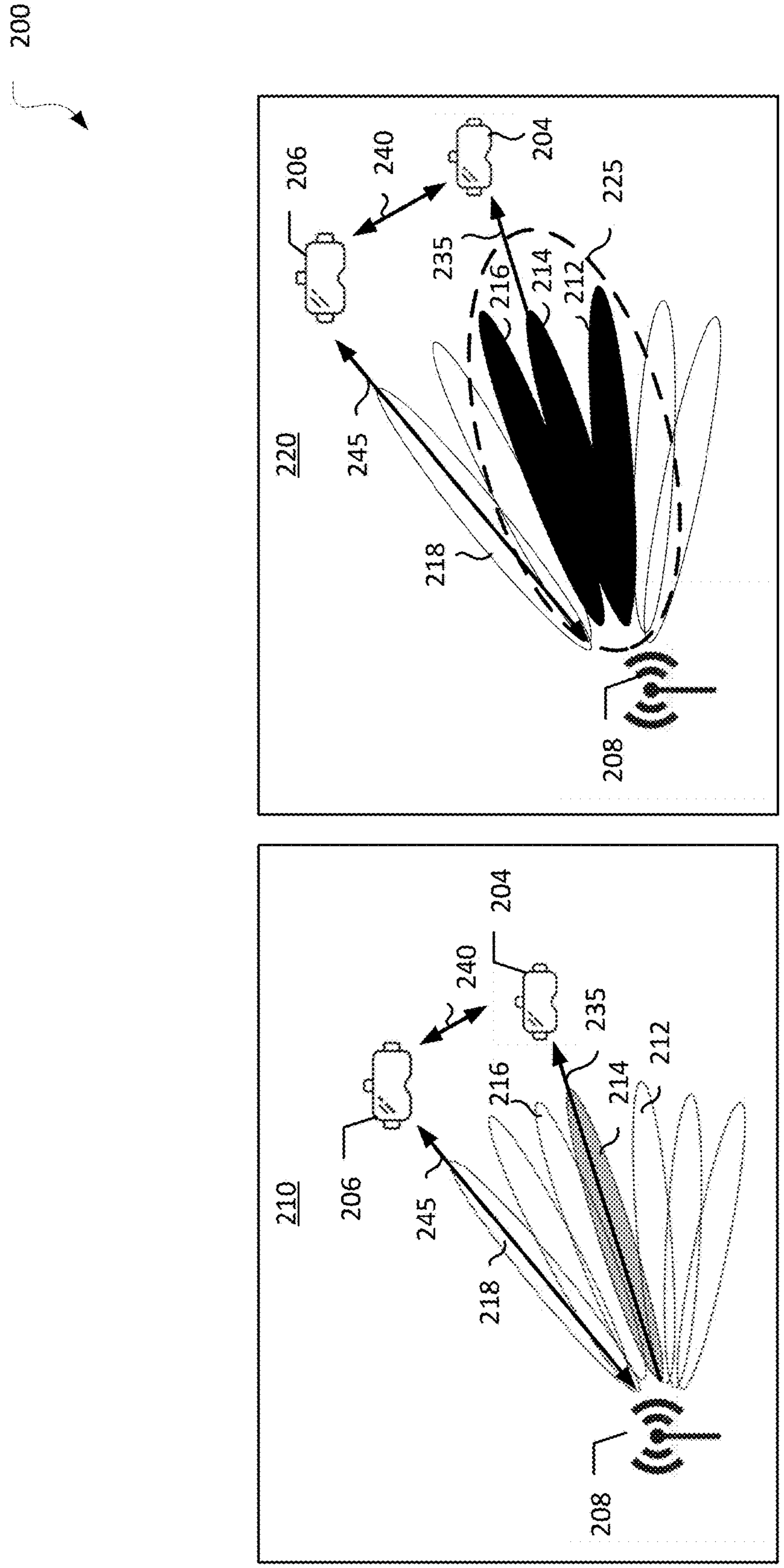
FIG. 2 illustrates network environments in accordance with some embodiments.

FIG. 2 illustrates a network environment 200 in accordance with some embodiments. The network environment 200 includes two transmission beam selection scenarios performed by the AP 208: transmission beam selection without beam search 210 and transmission beam selection with reduced beam search 220.

The network environment 200 may include the AP 208 and devices 204 and 206. The device 206 is communicatively connected with the AP 208 via a sub-THz communication link 245 and to the device 204 via P2P link 240. The AP 208 may use several beams, e.g., beams 212-218, to transmit information.

In 210, the AP 208 assigns the transmission beam 214 for transmitting to device 204. The AP 208 sends this information to the device 206 via link 245. For example, the AP 208 may send a BI, including beam configuration for device 204 to device 206. The AP 208 may also send GI, including orientation, location information, or timing information, to device 206 to be forwarded to device 204. In some instances, device 206 may have the GI information associated with the AP 208 and forward the available GI to the device 204. Device 206 may forward the received BI or GI from the AP 208 to the device 204 via the P2P link 240. The AP 208 and device 204 may establish a sub-THz communication link 235 via beam 214.

In scenario 220, the AP 208 may determine a set of beams 225, e.g., including beams 212, 214, and 216. The AP 208 may perform a beam search on the set of beams 225. The AP 208 may send a BI, including an indication of the set of beams 225 to the device 206 to be forwarded to device 204. The BI may include a beam index associated with a beam in the set and the number of beams, or all the indices of the beams in the set, to the device 206 to be forwarded to the device 204. Device 206 may forward the BI to the device 204 via the P2P link 240. The AP 208 and device 204 may perform a beam search on the reduced number of beams in the set of beams 225. The AP 208 and device 204 may establish a sub-THz communication link 235 via a beam in the set of beams 225, e.g., beam 214.

In some embodiments, the device 206 may provide the GI information associated with the device 204 to the AP 208. The device 206 may also provide BI information, including the beam index or beam alignment information used by AP 208 for communicating with device 206. The AP 208 may determine the BI for the device 204 based on the BI and GI it received from the device 206.

In one instance, the device 204 may locate very close to device 206 or move into a location previously occupied by the device 206. The AP 208 may use the same beam to establish a link with the device 204 as it was previously used to communicate with the device 206.

In one instance, the device 204 may move into the vicinity of the device 206 or in the proximity of the area previously occupied by the device 206. The AP 208 may determine the reduced set of beams 225 based on the beam it used to communicate with the device 206.

In one instance, the device 204, the device 206, or the AP 208 may predict or estimate the location of device 204 when the device 204 enters the range of the AP 208. The AP 208 may associate the estimated location of the device 204, with a beam or a set of beams previously used for communicating with one or more devices in the vicinity of the estimated location.

In one embodiment, AP 208 may inform device 206 about the beam pattern and timing. The device 206 may forward the information to device 204. Device 204 may use the information for beam detection.

Figure 3:
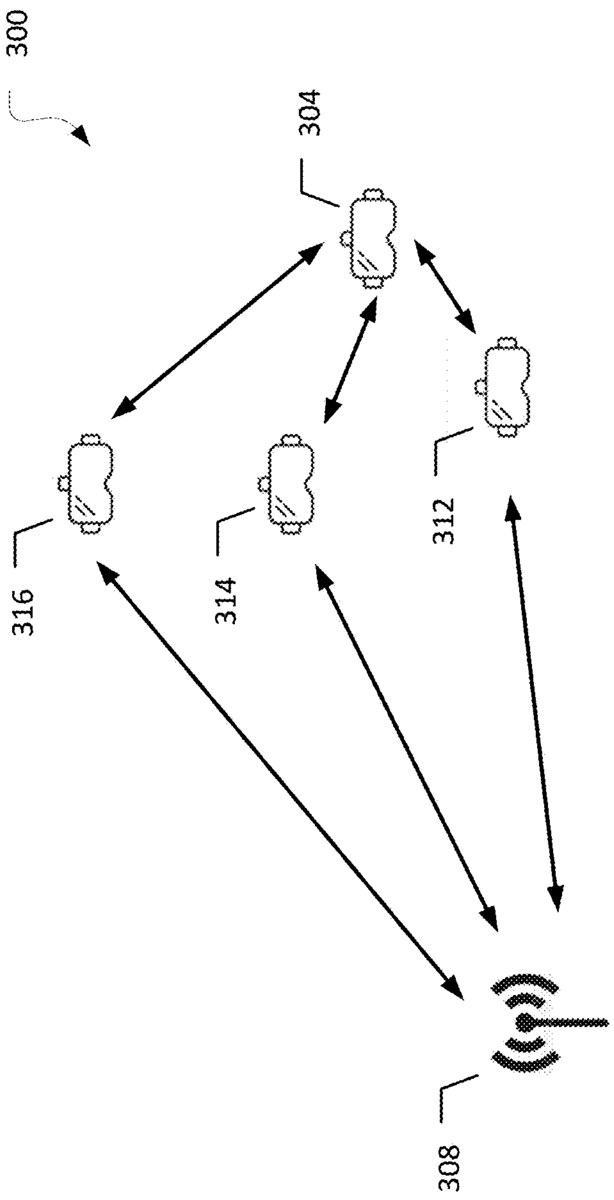
FIG. 3 illustrates a network environment in accordance with some embodiments.

FIG. 3 illustrates a network environment 300 in accordance with some embodiments. The network environment 300 includes devices 312, 314, and 316 that are connected with the AP 308 via sub-THz links. Devices 312, 314, and 316 are also connected with the device 304 via P2P links. Devices 312, 314, and 316 receive broadcasted messages from the device 304, indicating that the device 304 is seeking to establish a sub-THz communication link. The devices 312-316 may send BI and GI information to the AP 308. The AP 308 may prioritize or select one or more of devices 312-316 to select a beam or perform a reduced beam search.

In one instance, the AP 308 may use the information received from the first reporting device and ignore information received from other devices. Alternatively or additionally, the AP 308 may use the information from a device that is closest to device 304, e.g., the device 312. Alternatively or additionally, the AP 308 may randomly select information received from one of the devices. Alternatively or additionally, the AP 308 may process all the information it received from all devices associated with the device 304 to determine the beam or perform the beam search procedure on a reduced subset of beams.

The AP may also use information from other reporting devices that are in the vicinity of the device 304 but not at the same position as the device 304 is heading. The reports may not be associated with the device 304, but may include BI or GI that can be used to determine the beam or perform a beam search on a reduced subset of beams.

Figure 4:
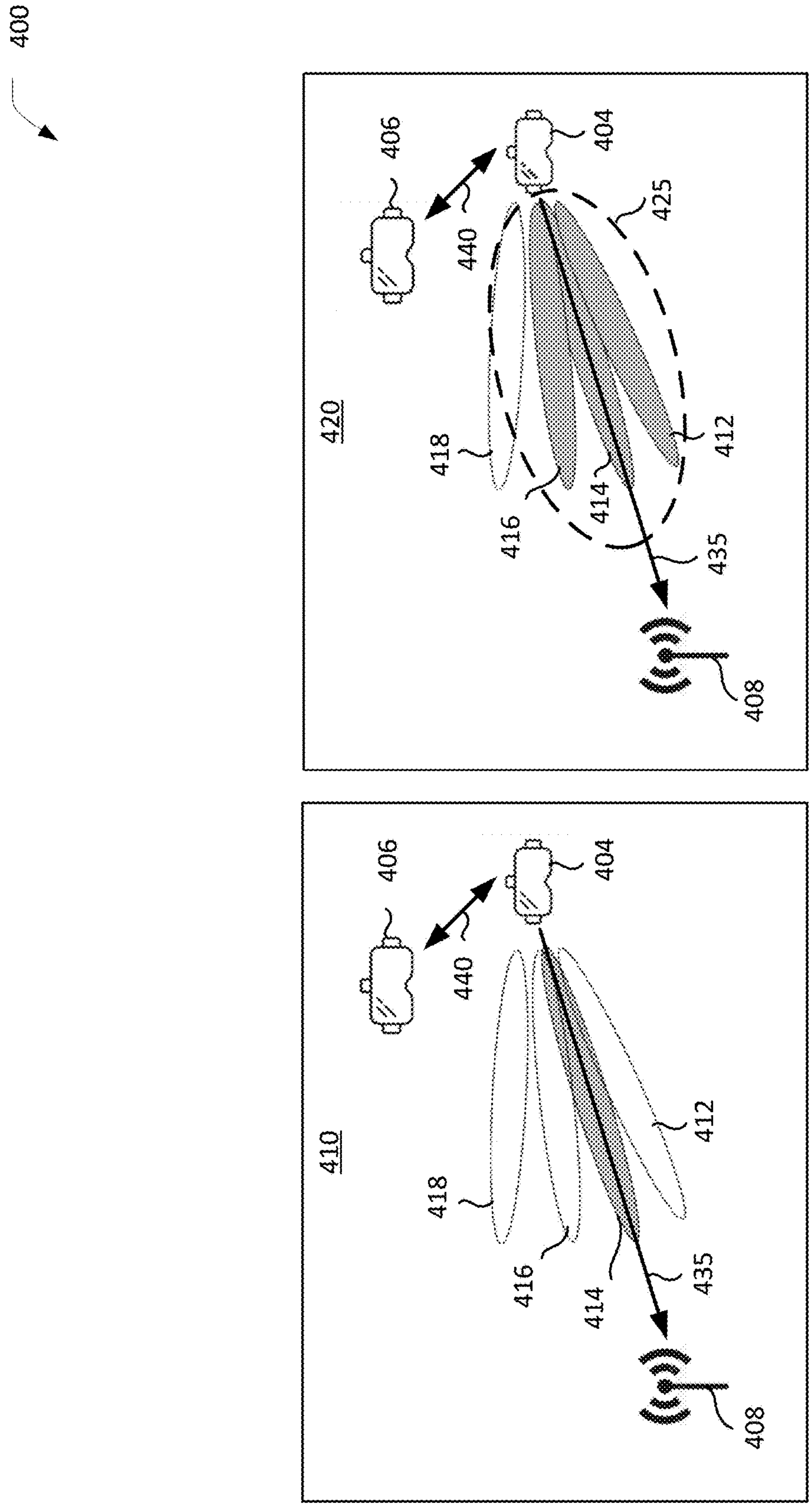
FIG. 4 illustrates a network environment in accordance with some embodiments.

FIG. 4 illustrates a network environment 400 in accordance with some embodiments. The network environment 400 includes two transmission beam selection scenarios performed by the device 404: beam selection without beam search 410 and beam selection with reduced beam search 420.

The network environment 400 may include the AP 408 and devices 404 and 406. The device 406 is communicatively connected with the AP 408 via a sub-THz communication link and to the device 404 via P2P link 440. The device 404 may use several beams, e.g., beams 412-418, to transmit information.

In 410, the device 408 may select the transmission beam 414 for transmitting to the AP 408. The device 408 may send this information to the AP 408 via device 406. For example, the device 404 may send a BI, including beam configuration, to device 406. The device 404 may also send GI, including orientation, location information, or timing information, to device 206 to be forwarded to the AP 408. Device 406 may forward the received BI or GI from the device 404 to the AP 408. The AP 408 and device 404 may establish a sub-THz communication link 435 via selected beam 414.

In scenario 420, the device 404 may determine a set of beams 425, e.g., including beams 412, 414, and 416. The device 404 may perform a beam search on the set of beams 425 to establish a sub-THz link with the AP 408. The device 404 may send a BI, including an indication of the set of beams 425 to the device 406 to be forwarded to AP 408. The BI may include a beam index associated with a beam in the set and the number of beams, or all the indices of the beams in the set, to the device 406 to be forwarded to the AP 408. The device 406 may forward the BI to the AP 408. The AP 408 and device 404 may perform a beam search on the reduced number of beams in the set of beams 425. The AP 408 and device 404 may establish a sub-THz communication link 435 via a beam in the set of beams 425, e.g., beam 414.

In some embodiments, the device 406 may provide the GI information associated with the device 406 to the device 404. The device 406 may also provide BI information, including the beam index or beam alignment information that is used by AP 408 for communicating with device 406. The device 406 may select the beam or perform a reduced beam search on the set of beams 425 based on the BI and GI it received from the device 406.

In one instance, the device 404 may be located very close to device 406 or move into a location previously occupied by the device 406. The device 404 may use the same beam to establish a link with the AP 408 as the device 406 used for communicating with the AP 408.

In one instance, the device 404 may move into the vicinity of the device 406 or in the proximity of the area previously occupied by the device 406. The device 404 may determine the reduced set of beams 425 based on the beam the device 406 used to communicate with the AP 408.

In one embodiment, the device 404 may inform device 406 about the beam pattern and timing. The device 406 may forward the information to the AP 408. The AP 408 may use the information for beam detection.

Figure 5:
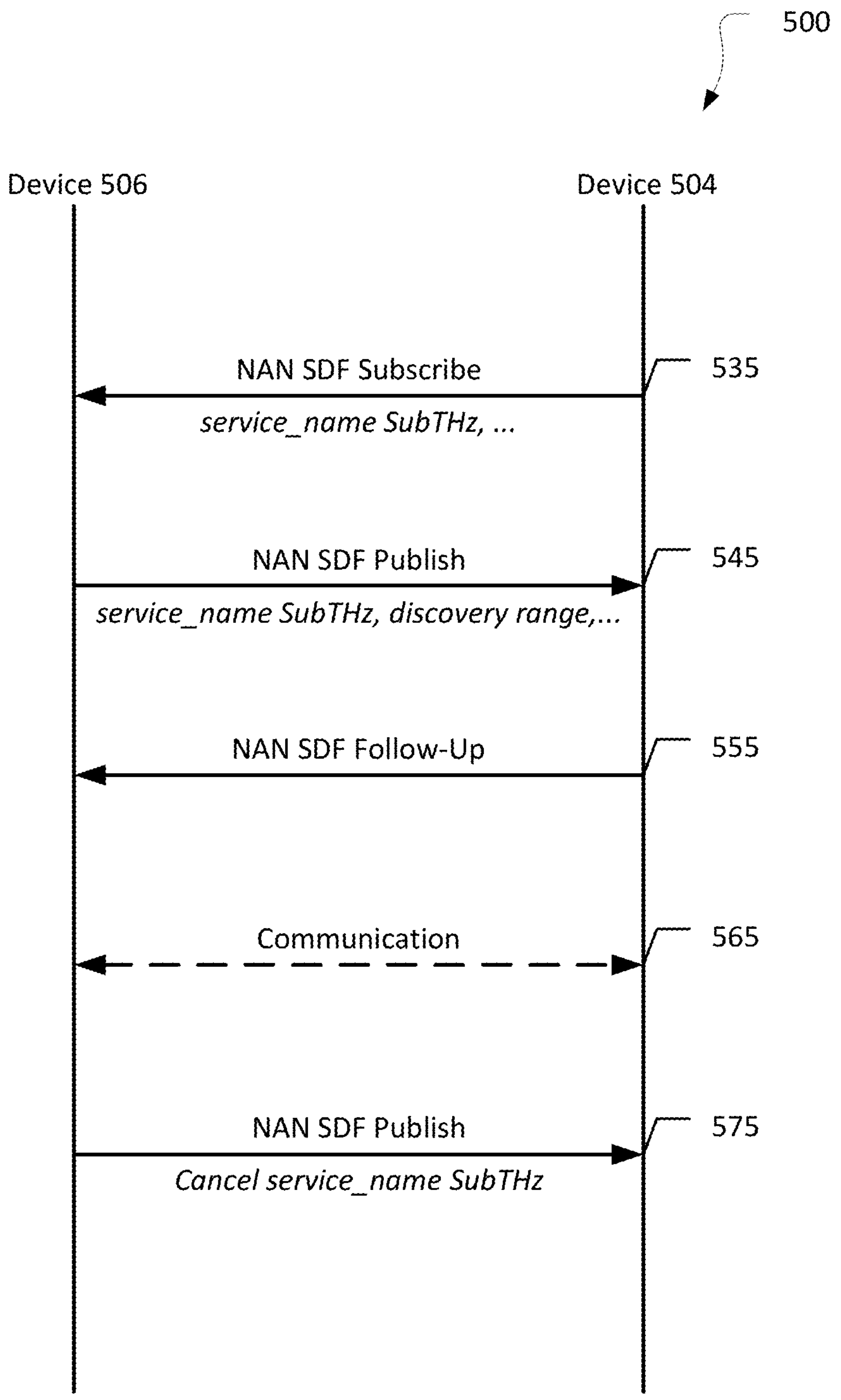
FIG. 5 illustrates a signaling diagram in accordance with some embodiments.
Figure 6:
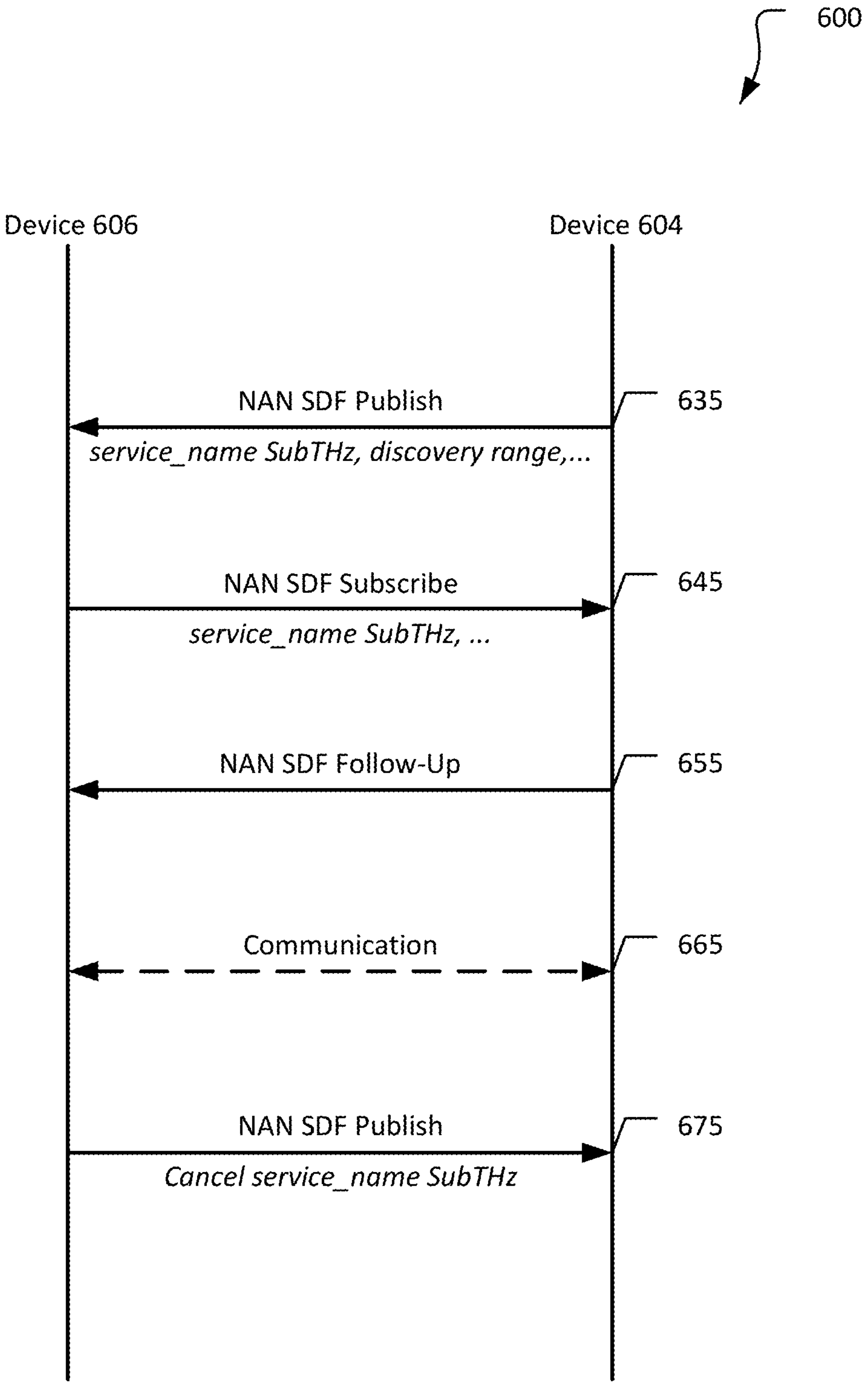
FIG. 6 illustrates a signaling diagram in accordance with some embodiments.

FIGS. 5 and 6 are examples of the implementation of the P2P network based on NAN, which may be similar to, or based on, the WiFi® NAN or Aware standards. FIG. 5 illustrates an active subscription flow, and FIG. 6 illustrates a passive subscription flow.

Devices of the P2P network may discover and connect directly to each other without any other type of connectivity between, e.g., AP or base station (BS) between them. The devices may establish a connection by using NAN discovery to publish a service on the service and subscribe to a service on the client. A service discovery frame (SDF) may be used for service discovery. Once the subscriber discovers the publisher, it can send a message from the subscriber to the publisher. Once two devices have discovered each other, they may create a bidirectional communication link.

In one embodiment, the devices may publish sub-THz services. Sub-THz service publishing and discovery may take place over the NAN discovery engine. The sub-THz device may support at least a single NAN SDF and simple NAN discovery protocol. A device connected to an AP and established a sub-THz link may act as a helper to a device searching for a sub-THz service.

The communication between the devices may take place over NAN data engine. Two fields, BI and GI, may support beam and location information.

FIG. 5 illustrates a signaling diagram 500 in accordance with some embodiments. Consider that the device 506 is connected to an AP via an established sub-THz link, and the device 504 is not connected to an AP and is looking for a sub-THz service. The device 504 is actively looking for sub-THz services.

At 535, the device 504 may send a NAN SDF subscribe method, including service identification information, e.g., service name associated with the sub-THz services. The method may indicate that the device 504 needs help to discover the sub-THz services. The device 504 may indicate the name of the service associated with any directional communication services, e.g., millimeter wave or 60 giga Hz services.

At 545, the device 506 may send NAN SDF publish with the name and identifier associated with the sub-THz service in the method. By sending the publish method, the device 506 may make itself discoverable by the device 504.

At 555, the device 504 may send NAN SDF follow-up to request updated information about the sub-THz services. The follow-up method may include the name of the service and the time at which the device 504 received information about the service.

At 565, the P2P communication link between the devices 504 and 506 is established. The devices may exchange information, including BIs and GIs.

At 575, the device 506 may send a NAN SDF publish method to cancel the P2P link with the device 504. The method may include a cancel service method and the name of the service to be canceled.

FIG. 6 illustrates a signaling diagram 600 in accordance with some embodiments. Consider that the device 606 is connected to an AP via an established sub-THz link, and the device 604 is not connected to an AP and is looking for a sub-THz service. The device 604 passively looks for sub-THz services by waiting and listening for a device, e.g., device 606, to broadcast published sub-THz services.

At 635, the device 604 may send NAN SDF publish with the name and identifier associated with the sub-THz service in the method. By sending the publish method, the device 604 may make itself discoverable by the device 606.

At 645, the device 606 may send a NAN SDF subscribe method, including service identification information, e.g., the service name associated with the sub-THz services. The method may indicate that the device 606 needs help to discover the sub-THz services. The device 606 may indicate the name of the service associated with any directional communication services, e.g., millimeter wave or 60 giga Hz services.

At 655, the device 604 may send NAN SDF follow-up to request updated information about the sub-THz services. The follow-up method may include the name of the service and the time at which the device 604 received information about the service.

At 665, the P2P communication link between the devices 604 and 606 is established. The devices may exchange information, including BIs and GIs.

At 675, the device 606 may send a NAN SDF publish method to cancel the P2P link with the device 604. The method may include a cancel service method and the name of the service to be canceled.

Figure 7:
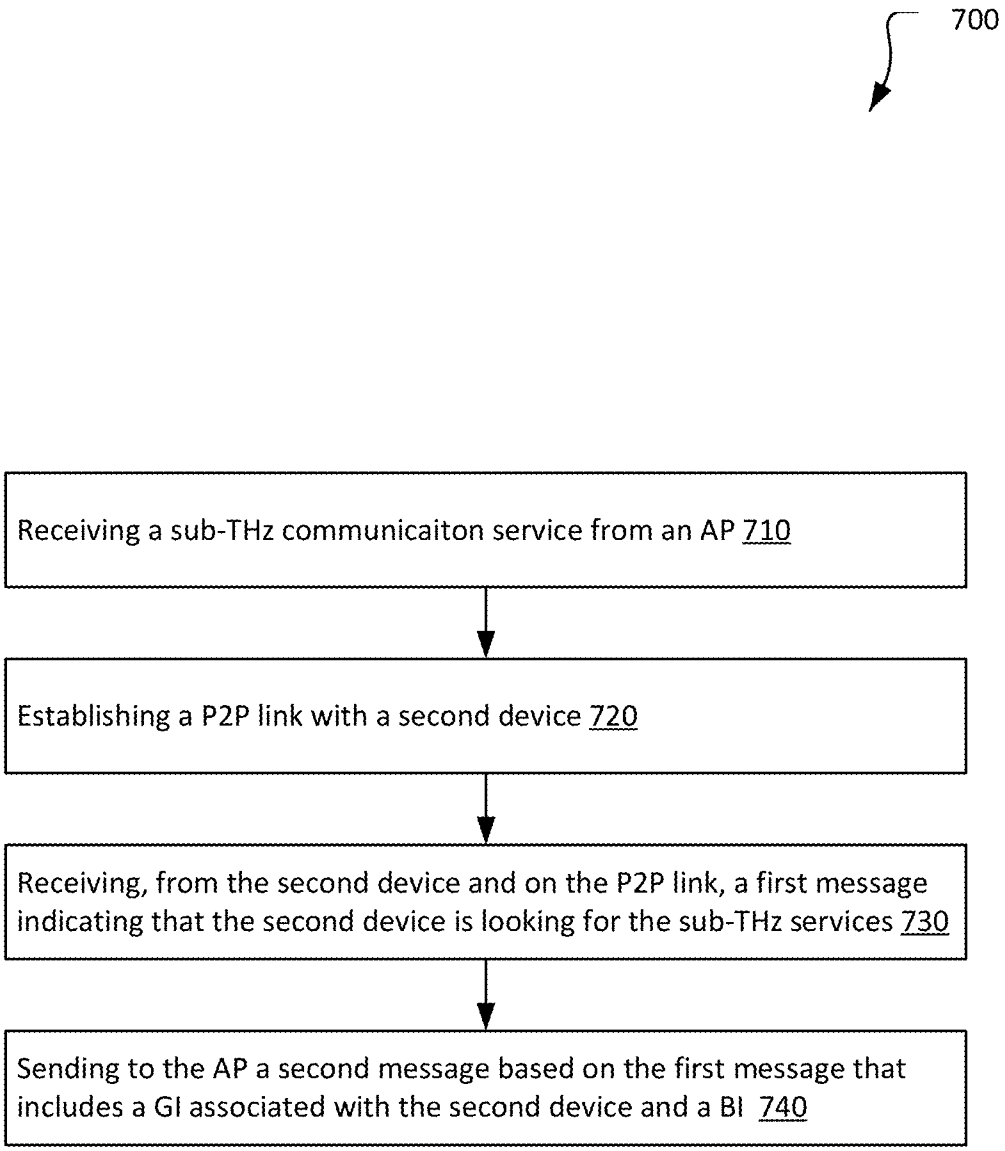
FIG. 7 illustrates an operational flow/algorithmic structure in accordance with some embodiments.

FIG. 7 illustrates an operational flow/algorithmic structure 700 in accordance with some embodiments. The operation flow/algorithmic structure 700 may be implemented by a device (for example, device 106 or device 1000) or components therein, for example, processing circuitry 1004.

The operation flow/algorithmic structure 700 may include, at 710, receiving a sub-THz communication service from an AP. The device may be communicatively coupled with the AP via a sub-THz communication link. The device may receive GI from the AP, e.g., location information or orientation information of the AP.

The operation flow/algorithmic structure 700 may include, at 720, establishing a P2P communication link with a second device. The second device may be out of the AP range and not have a sub-THz communication link with the AP. The P2P link may be based on WLAN NAN technology.

The operation flow/algorithmic structure 700 may include, at 730, receiving a message from the second device. The message may be sent using the P2P link. The message may indicate that the second device is looking for a sub-THz or a highly directional service. The second device may send an NAN SDF subscribe method in the message.

The operation flow/algorithmic structure 700 may include, at 740, sending a message to the AP based on the received message from the second device on the P2P link. The message may include a GI or a BI. The BI may include beam information associated with the AP or the second device. The device may receive the AP's GI and BI information and forward them to the second device. The device may receive GI and BI information from the second device and forward them to the AP. The device may send its own GI and BI information to the AP or the second device. The GI may include location information or orientation information. The BI may include indications associated with one or more beams, e.g., one or more beam indices.

Figure 8:
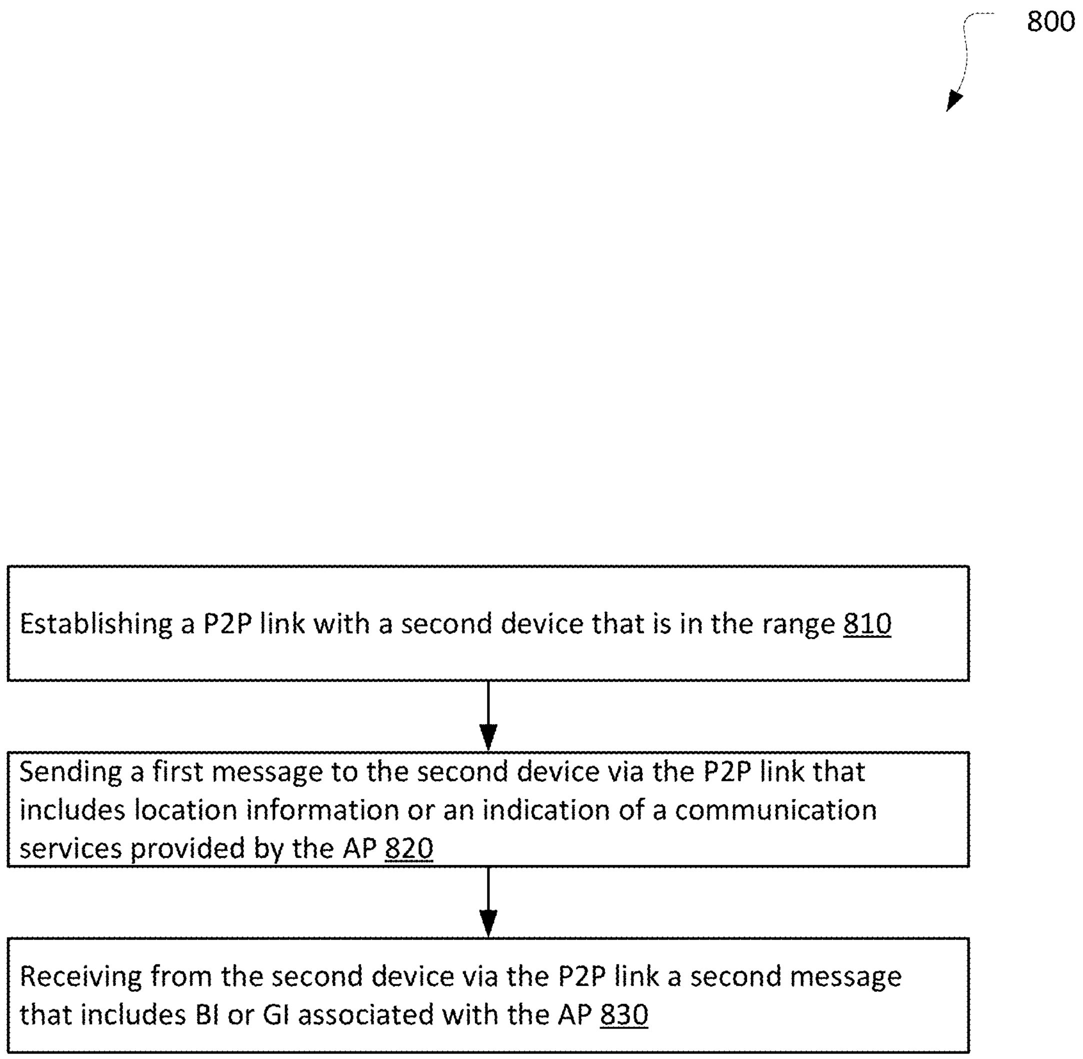
FIG. 8 illustrates an operational flow/algorithmic structure in accordance with some embodiments.

FIG. 8 illustrates an operational flow/algorithmic structure 800 in accordance with some embodiments. The operation flow/algorithmic structure 800 may be implemented by a device (for example, device 104 or device 1000) or components therein, for example, processing circuitry 1004.

The operation flow/algorithmic structure 800 may include, at 810, establishing a P2P link with a second device. The P2P link may be based on WLAN NAN technology.

The operation flow/algorithmic structure 800 may include, at 820, sending a first message to the second device. The device may send the message using the P2P link. The message may include the location information or a discovery indication indicating that the device is looking for a service. The service may be a sub-THz service.

The operation flow/algorithmic structure 800 may include, at 830, receiving a second message from the second device on the P2P link. The message may include BI or GI associated with an AP. The device may determine a beam or a subset of beams based on the second P2P message. The device may transmit to the AP using the determined beam. The device may perform a beam search process based on the determined subset of beams.

Figure 9:
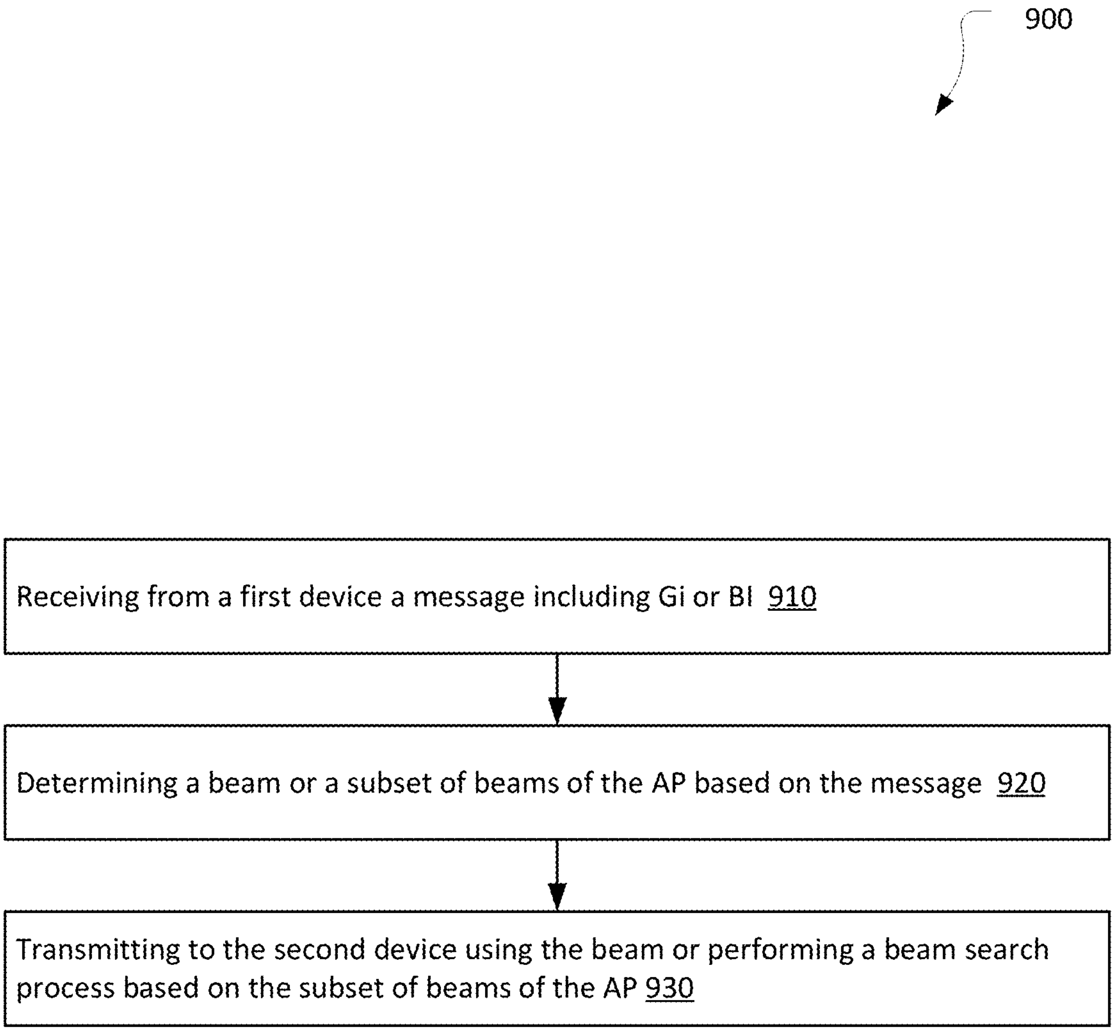
FIG. 9 illustrates an operational flow/algorithmic structure in accordance with some embodiments.

FIG. 9 illustrates an operational flow/algorithmic structure 900 in accordance with some embodiments. The operational flow/algorithmic structure 900 may be implemented by an AP, for example, the AP 108, the network node 1100, or components therein, e.g., processors 1104.

The operational flow/algorithmic structure 900 may include, at 910, receiving a message from a first device. The message may include a GI or a BI. The GI may be associated with a second device. The BI may be associated with the first device or the second device.

The operational flow/algorithmic structure 900 may include, at 920, determining a beam or a subset of beams of the AP based on the message. The AP may perform a beam selection without beam search by selecting a beam based on the received message.

The operational flow/algorithmic structure 900 may include, at 930, transmitting to the second device using the selected beam. The AP may perform a beam search process based on the subset of the beams to identify a suitable beam for communicating with the second device.

Figure 10:
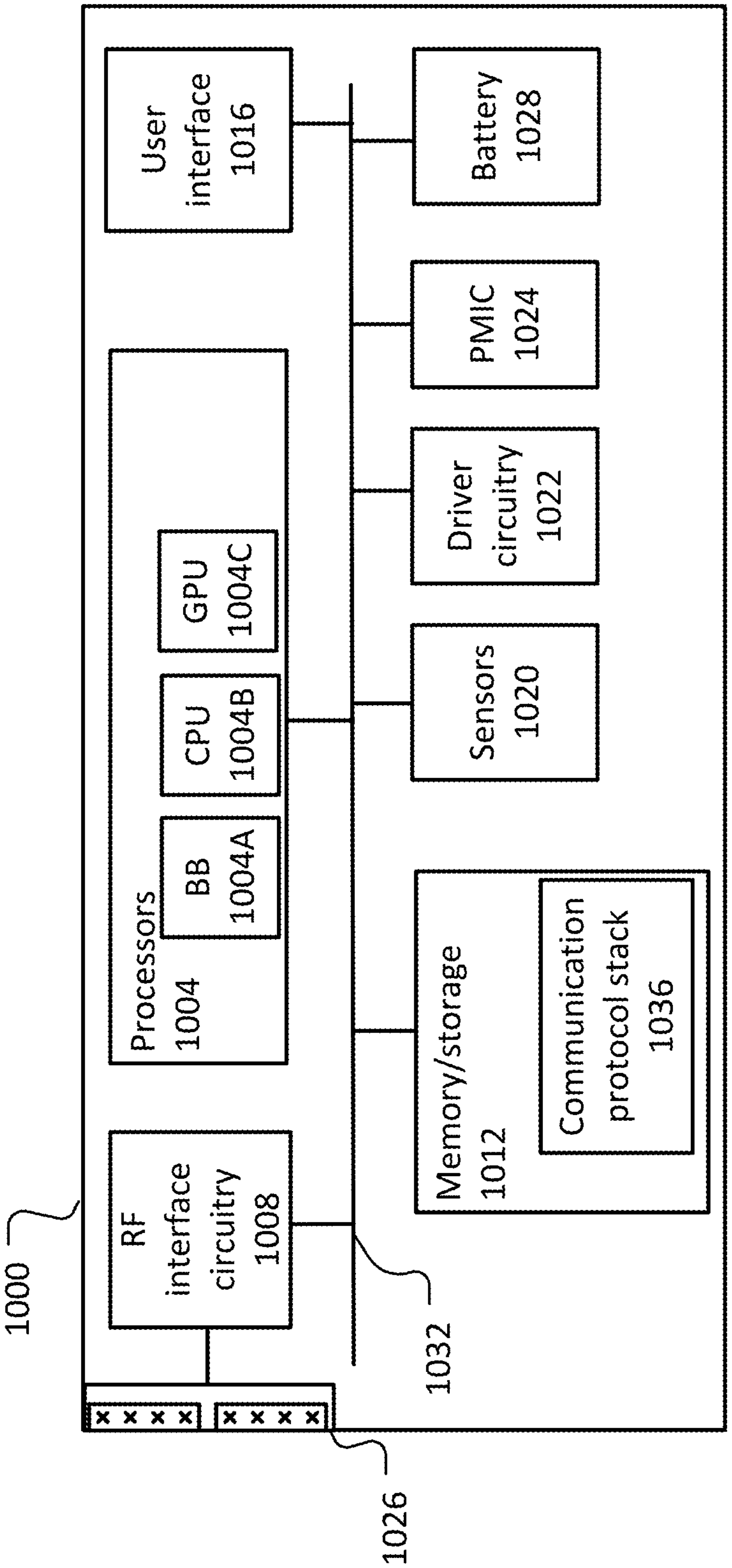
FIG. 10 illustrates a user equipment in accordance with some embodiments.

FIG. 10 illustrates a UE 1000 in accordance with some embodiments. The UE 1000 may be similar to and substantially interchangeable with devices 104 or 106 of FIG. 1.

The UE 1000 may be any mobile or non-mobile computing device, such as, for example, a mobile phone, computer, tablet, XR device, glasses, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, camera or video camera), wearable device (for example, a smartwatch), or Internet-of-things device.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangements of the components shown may occur in other implementations.

The components of the UE 1000 may be coupled with various other components over one or more interconnects 1032, which may represent any type of interface, input/output, bus (local, system, or expansion), transmission line, trace, or optical connection that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

The processors 1004 may perform operations associated with establishing P2P link or sub-THz link consistent with embodiments described herein.

In some embodiments, the baseband processor circuitry 1004A may access a communication protocol stack 1036 in the memory/storage 1012 to communicate over a 3GPP-compatible network. In general, the baseband processor circuitry 1004A may access the communication protocol stack 1036 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based on the cyclic prefix OFDM (CP-OFDM) in the uplink or downlink and discrete Fourier transform spread OFDM (DFT-S-OFDM) in the uplink.

The memory/storage 1012 may include one or more non-transitory, computer-readable media that includes instructions (for example, the communication protocol stack 1036) that may be executed by one or more of the processors 1004 to cause the UE 1000 to perform various operations described herein. The memory/storage 1012 includes any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 1008 may include transceiver circuitry and a radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processor 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, or phased array antennas. The antenna 1026 may have one or more panels designed for specific frequency bands, including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input, including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual displays, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various I/O devices that may be present within or connected to the UE 1000. For example, the driver circuitry 1022 may include circuitry to facilitate the coupling of a universal integrated circuit card (UICC) or a universal subscriber identity module (USIM) to the UE 1000. For additional examples, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage the power provided to various components of the UE 1000. In particular, with respect to the processors 1004, the PMIC 1024 may control power-source selection, voltage scaling, battery charging, or DC-to-DC conversion.

In some embodiments, the PMIC 1024 may control or otherwise be part of various power-saving mechanisms of the UE 1000, including DRX, as discussed herein.

A battery 1028 may power the UE 1000, although in some examples, the UE 1000 may be mounted and deployed in a fixed location and may have a power supply coupled to an electrical grid. The battery 1028 may be a lithium-ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
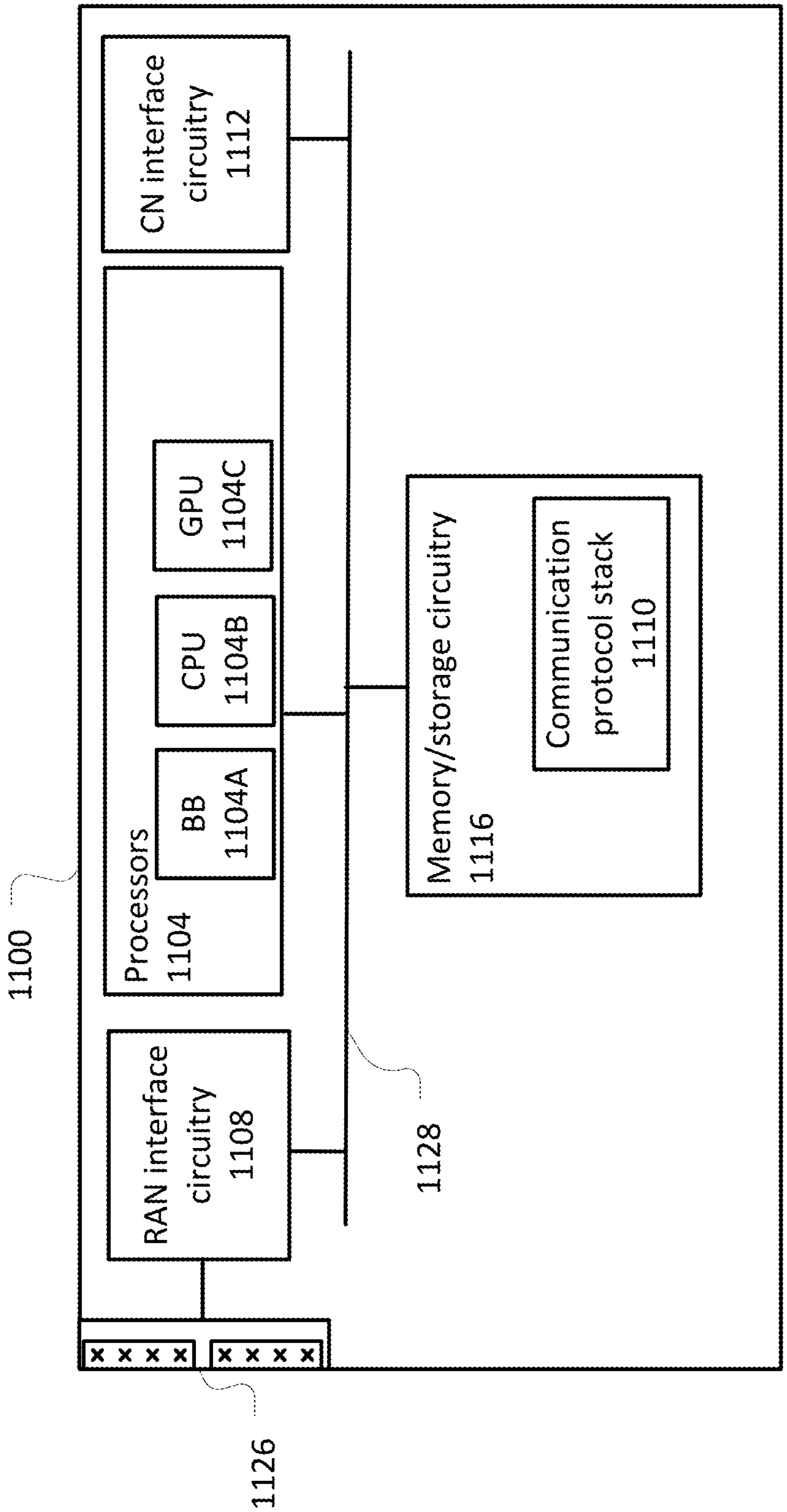
FIG. 11 illustrates a network node in accordance with some embodiments.

FIG. 11 illustrates a network node 1100 in accordance with some embodiments. The network node 1100 may be similar to and substantially interchangeable with AP 108, a device implementing one of the network hops, an integrated access and backhaul (IAB) node, a network-controlled repeater, or a server in a core network or external data network.

The network node 1100 may include processors 1104, RF interface circuitry 1108 (if implemented as an access node), the core node (CN) interface circuitry 1112, memory/storage circuitry 1116, and antenna structure 1126.

The components of the network node 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The processors 1104 may perform operations associated with establishing sub-THz link with a device consistent with embodiments described herein.

The CN interface circuitry 1112 may provide connectivity to a core network, for example, a 5th Generation Core network (5GC) using a 5GC-compatible network interface protocol such as carrier Ethernet protocols or some other suitable protocol. Network connectivity may be provided to/from the network node 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the network node 1100 may be coupled with transmit-receive points (TRPs) using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

EXAMPLES

In the following sections, further exemplary aspects are provided.

Example 1 includes a method implemented by a first device, the method including: receiving, from an access point (AP), first communication services; establishing a peer-to-peer (P2P) communication link with a second device; receiving, from the second device via the P2P communication link, a P2P message including indications that the second device is moving in a direction and that the second device would request second communication services from the AP; and sending, to the AP, an AP message, based on the P2P message, including a geometry indication (GI) associated with the second device and beam information (BI).

Example 2 includes the method of example 1 or some other examples herein, wherein: the BI includes a transmission beam from the AP to the first device, or a transmission beam from the second device to the AP; and the P2P message includes service identification information.

Example 3 includes the method of examples 1 or 2 or some other examples herein, wherein the GI is a first GI, the BI is a first BI, and the method further includes: sending, to the second device via the P2P communication link, a second GI associated with the first device, a third GI associated with the AP, or a second BI associated with the AP.

Example 4 includes the method of any of examples 1-3 or some other examples herein, wherein the second GI associated with the first device includes: location information associated with the first device, of an orientation of the first device.

Example 5 includes the method of any of examples 1-4 or some other examples herein, wherein the third GI associated with the AP includes an orientation of the AP or location information of the AP.

Example 6 includes the method of any of examples 1-5 or some other examples herein, wherein the third BI associated with the AP includes beam configuration of the AP or an indication of a transmitting beam of the AP.

Example 7 includes the method of any of examples 1-6 or some other examples herein, further including: receiving, from the AP, beam pattern information or timing information of the AP; and forwarding, to the second device via the P2P communication link, the beam pattern information or timing information of the AP.

Example 8 includes a method implemented by a first device, the method including: establishing a peer-to-peer communication link with a second device in proximity to the first device; sending, to the second device via the P2P communication link, a first P2P message including location information or an indication of communication services provided by an access point (AP); and receiving, from the second device via the P2P communication link, a second P2P message, including beam information (BI) indicating an AP transmission beam or geometry indication (GI), including orientation or location information.

Example 9 includes the method of example 8 or some other examples herein, wherein the second P2P message includes beam pattern information or timing information of the AP.

Example 10 includes the method of examples 8 or 9 or some other examples herein, the method further including: determining, based on the second P2P message, a transmitting beam associated with the AP; and receive, from the AP, signaling on the transmitting beam associated with the AP.

Example 11 includes the method of any of examples 8-10 or some other examples herein, the method further including: determining, based on the second P2P message, one or more transmitting beams associated with the AP; and monitoring the one or more transmitting beams associated with the AP for a signal from the AP.

Example 12 includes the method of any of examples 8-11 or some other examples herein, wherein the first P2P massage includes beam pattern information or timing information of the first device.

Example 13 includes a method implemented by an access point (AP), the method including: receiving, from a first device, a message including a geometry indication (GI) associated with a second device or beam information (BI); and determining a beam or a subset of beams of the AP based on the message; and transmitting to the second device on the beam or performing a beam search process based on the subset of beams of the AP.

Example 14 includes the method of example 13 or some other examples herein, the method further including: sending, to the first device, a configuration, including beam pattern information or timing information.

Example 15 includes the method of examples 13 or 14 or some other examples herein, wherein the GI associated with the second device includes location information or device orientation.

Example 16 includes the method of any of examples 13-15 or some other examples herein, the method further including: estimating a location of the second device based on the GI associated with the second device; and determining a transmission beam based on the estimated location of the second device.

Example 17 includes the method of any of examples 13-16 or some other examples herein, wherein the BI includes an indication of a receiving beam by the first device, a transmitting beam by the first device, or a transmitting beam by the second device.

Example 18 includes the method of any of examples 13-17 or some other examples herein, wherein the BI includes an indication of transmitting beam by the first device, or a transmitting beam by the second device, and the method further including: determining a receiving beam associated with the second device based on the BI; and receiving, from the second device, signaling on the receiving beam associated with the second device.

Example 19 includes the method of any of examples 13-18 or some other examples herein, wherein the BI includes an indication of the transmitting beam by the first device, or the transmitting beam by the second device, and the method further includes: determining one or more receiving beams associated with the second device based on the BI; and monitor the one or more receiving beams associated with the second device for a signal from the second device.

Example 20 includes the method of any of examples 13-19 or some other examples herein, where in the GI is first GI, and the BI is first BI, and the method further includes: receiving one or more GIs, including the first GI, or one or more BIs, including the second BI, the one or more GIs or the one or more BIs associated with the second device; and selecting a second GI from the one or more GIs or a second BI from the one or more BIs.

Another example may include an apparatus comprising logic, modules, or circuitry to perform one or more elements of a method described in or related to any of examples 1-20, or any other method or process described herein.

Another example may include a method, technique, or process as described in or related to any of examples 1-20, or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-20, or portions thereof.

Another example includes a signal as described in or related to any of examples 1-20, or portions or parts thereof.

Another example may include a datagram, information element, packet, frame, segment, PDU, or message as described in or related to any of examples 1-20, or portions or parts thereof, or otherwise described in the present disclosure.

Another example may include a signal encoded with data as described in or related to any of examples 1-20, or portions or parts thereof, or otherwise described in the present disclosure.

Another example may include a signal encoded with a datagram, IE, packet, frame, segment, PDU, or message as described in or related to any of examples 1-20, or portions or parts thereof, or otherwise described in the present disclosure.

Another example may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Another example may include a computer program comprising instructions, wherein execution of the program by a processing element is to cause the processing element to carry out the method, techniques, or process as described in or related to any of examples 1-20, or portions thereof.

Another example may include a signal in a wireless network as shown and described herein.

Another example may include a method of communicating in a wireless network as shown and described herein.

Another example may include a system for providing wireless communication as shown and described herein.

Another example may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method to be implemented by processor circuitry of a first device, the method comprising:

processing first communication services received from an access point (AP);

establishing a peer-to-peer (P2P) communication link with a second device;

processing a P2P message received from the second device via the P2P communication link, the P2P message including a first indication that the second device is moving in a direction and a second indication that the second device is to request second communication services from the AP; and generating, based on the P2P message, an AP message to be transmitted to the AP, wherein the AP message includes a geometry indication (GI) associated with the second device and beam information (BI).

2. The method of claim 1, wherein:

the BI includes an indication of a transmission beam from the AP to the first device, or an indication of a transmission beam from the second device to the AP; and the P2P message includes service identification information.

3. The method of claim 1, wherein the GI is first GI, the BI is first BI, and the method further comprises:

generating a second GI associated with the first device, a third GI associated with the AP, or second BI associated with the AP to be transmitted to the second device via the P2P communication link.

4. The method of claim 3, wherein:

said generating the second GI associated with the first device, the third GI associated with the AP, or the second BI associated with the AP comprises generating the second GI associated with the first device to be transmitted to the second device via the P2P communication link; and the second GI associated with the first device includes:

location information associated with the first device; or an orientation of the first device.

5. The method of claim 3, wherein:

said generating the second GI associated with the first device, the third GI associated with the AP, or the second BI associated with the AP comprises generating the third GI associated with the AP to be transmitted to the second device via the P2P communication link; and the third GI associated with the AP includes:

an orientation of the AP; or location information of the AP.

6. The method of claim 3, wherein:

said generating the second GI associated with the first device, the third GI associated with the AP, or the second BI associated with the AP comprises generating the second BI associated with the AP to be transmitted to the second device via the P2P communication link; and the second BI associated with the AP includes:

a beam configuration of the AP; or an indication of a transmitting beam of the AP.

7. The method of claim 1, wherein the P2P message is a first P2P message and the method further comprises:

processing beam pattern information or timing information of the AP received from the AP; and generating a second P2P message including the beam pattern information or timing information of the AP, the second P2P message to be transmitted to the second device via the P2P communication link.

8. An apparatus comprising:

processing circuitry to:

establish a peer-to-peer (P2P) communication link with a device in proximity to the apparatus;

generate a first P2P message to be transmitted to the device via the P2P communication link, the first P2P message including first location information or an indication of communication services provided by an access point (AP); and processing a second P2P message received from the device via the P2P communication link, the second P2P message including beam information (BI) indicating:

an AP transmission beam; or a geometry indication (GI) that includes orientation or second location information; and interface circuitry coupled with the processing circuitry, the interface circuitry to receive the second P2P message.

9. The apparatus of claim 8, wherein the second P2P message includes beam pattern information or timing information of the AP.

10. The apparatus of claim 8, wherein the processing circuitry is further to:

determine, based on the second P2P message, a transmission beam associated with the AP; and receive, from the AP, signaling on the transmission beam associated with the AP.

11. The apparatus of claim 8, wherein the processing circuitry is further to:

determine, based on the second P2P message, one or more transmission beams associated with the AP; and monitor the one or more transmission beams associated with the AP for a signal from the AP.

12. The apparatus of claim 8, wherein the first P2P message includes beam pattern information or timing information associated with the apparatus.

13. A method comprising:

establishing a peer-to-peer (P2P) communication link with a device;

processing a first P2P message received from the device via the P2P communication link, the first P2P message including first location information or an indication of communication services provided by an access point (AP); and generating a second P2P message to be transmitted to the device via the P2P communication link, the second P2P message including beam information (BI) indicating:

an AP transmission beam; or a geometry indication (GI) that includes orientation or second location information.

14. The method of claim 13, wherein the second P2P message includes beam pattern information or timing information of the AP.

15. The method of claim 13, wherein the device is a first device and wherein the first P2P message includes beam pattern information or timing information associated with a second device.

* * * * *